United States Patent [19]

Harding

[11] Patent Number: 5,069,549
[45] Date of Patent: Dec. 3, 1991

[54] MOIRE CONTOURING CAMERA

[75] Inventor: Kevin G. Harding, Ann Arbor, Mich.

[73] Assignee: Industrial Technology Institute, Ann Arbor, Mich.

[21] Appl. No.: 608,571

[22] Filed: Nov. 2, 1990

[51] Int. Cl.⁵ ............................................. G01B 11/24
[52] U.S. Cl. .................................. 356/376; 250/237 G
[58] Field of Search ....................... 356/372, 374, 376; 250/237 G

[56] References Cited

U.S. PATENT DOCUMENTS

| | | |
|---|---|---|
| 3,245,307 | 4/1966 | De Lang . |
| 3,614,237 | 10/1971 | Kyle et al. ........................... 356/376 |
| 4,525,858 | 6/1985 | Cline et al. ............................... 382/1 |
| 4,564,295 | 1/1986 | Halioua ................................ 356/376 |
| 4,577,940 | 3/1986 | Krasinski et al. .................... 356/376 |
| 4,641,972 | 2/1972 | Halioua et al. ....................... 356/376 |

OTHER PUBLICATIONS

Cline et al., "Automatic Moire Contouring", *Applied Optics*, vol. 23, No. 10, 15 May 1984, pp. 1454–1459.
Harding et al—Small Angle Moire Contouring, SPIE, vol. 85–Optics, Illumination, and Image Sensing for Machine Vision II, 1987, pp. 166–173.

*Primary Examiner*—F. L. Evans
*Attorney, Agent, or Firm*—Harness, Dickey & Pierce

[57] ABSTRACT

A moire contouring imaging device for small field moire imaging in which both the illumination and viewing optical beam paths pass through a common primary lens and optical grating. The use of such common optical elements improves optical stability and accuracy since magnification and focal length and other mismatching between discrete optical elements in the viewing and illumination paths are avoided. The device is assembled in a rugged elongated housing. Additional features are provided to avoid the effects of unwanted stray light reflected off rear surfaces of optical elements within the system.

13 Claims, 1 Drawing Sheet

MOIRE CONTOURING CAMERA

BACKGROUND AND SUMMARY OF THE INVENTION

This invention relates to an optical device for evaluating the contours of a workpiece and particularly to one which uses moire principles.

Optical contouring systems using moire principles have been in use for some time. In one type of such system, a known periodic pattern such as a grating is projected onto the surface to be evaluated and the image of the grating as taken from a direction askew from the illumination direction as deformed by the surface is analyzed to determine the profile. The deformed grating image is often super-imposed upon a matched reference grating which amplifies the grating deformation and results in the well-known moire fringe patterns. Such fringe patterns are easily interpreted as surface contours by an observer or through automated means. The resulting fringe patterns are lines of equal depth change, which are independent of object orientation, rigid body displacement, color or marking on the part. The typical approach for providing the moire pattern is to use separate projection and reference gratings which are positioned in the optical paths of the illumination and viewing system respectively. Similarly, separate primary lenses are used for projecting the focused image of the grating onto the object and for focusing that image onto an image detector or eyepiece.

Although present moire contouring systems operate satisfactorily, the use of separate gratings and primary lenses produces a number of disadvantages. For example, slight differences in the magnification of two gratings on the object and detector produce changes in the moire interference pattern which are independent of workpiece contour. When such magnification errors exist, the differences produce a fringe pattern due to a displacement of portions of the projected and reference gratings, even when the workpiece is truly flat. Similarly, slight differences in focus and/or alignment of the two primary lenses cause distortion of the image. The use of separate primary lenses and gratings also produce a stability problem, since even minute relative motion between these elements can cause image distortion. Even when purchasing expensive optics, it is difficult to obtain two lenses which are preciously matched in terms of their magnification and focal length. In addition to the above mentioned disadvantages, the requirement of separate lens and grating elements further increases the cost of the imaging device since these elements must be separately purchased, mounted, installed and aligned.

The present invention is related to a moire contouring imaging device or camera which overcomes the above mentioned disadvantages of prior art designs. The advantages of the present invention are achieved primarily through the use of a single optical grating and primary lens for both the projection and viewing optical paths for improved stability and optical performance. The optical system in accordance with this invention features the illumination beam light path being inclined with respect to the viewing light path, both of which pass through a common grating and primary lens. Due to the inclination of the two beams, one of the beams must be redirected so that they will converge upon a focal plane where the object to be evaluated is placed. In accordance with the embodiment of this invention shown in the appended drawings, the illumination optical path is reflected by a mirror to cause it to converge with the viewing optical path upon the object being evaluated. The invention further incorporated features to enhance its simplicity, durability and definition of produced images by reducing the problems of stray light within the device.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
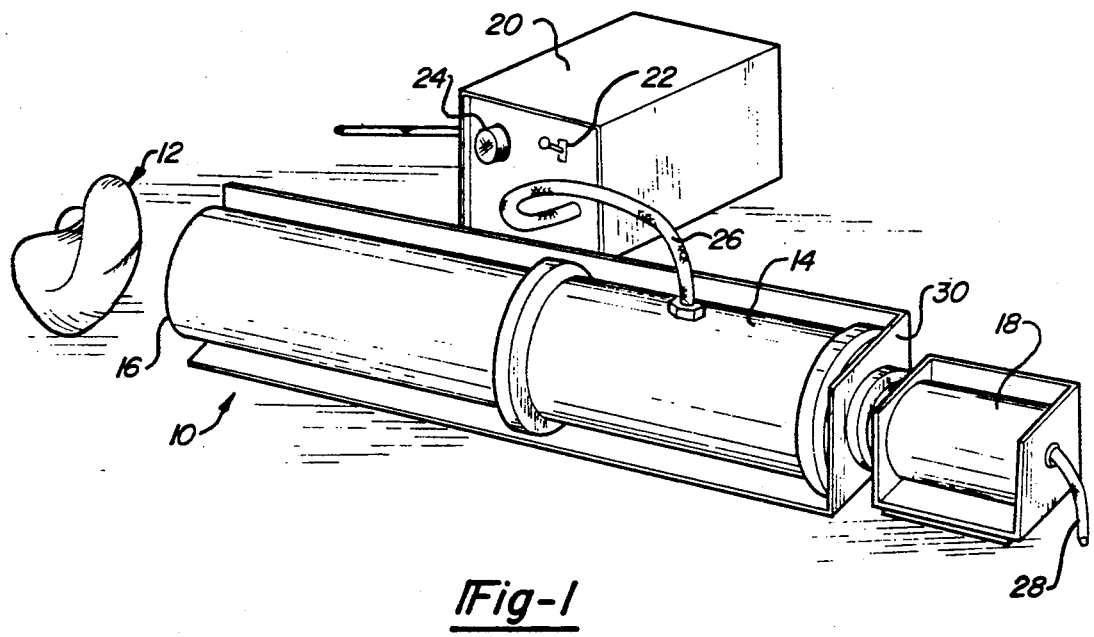
FIG. 1 is a pictorial view of a moire contouring device in accordance with this invention shown with a remote light source and workpiece being characterized.

A moire contouring camera is shown in FIG. 1 and is generally designated there by reference number 10. Camera 10 is shown in FIG. 1 being used to characterize the surface configuration of a arbitrary workpiece 12. As is shown, the device 10 comprises an elongated housing 14 having a viewing end 16 with the opposite end mounting a video camera 18. The light source for the device is mounted in a separate housing 20 having on/off switch 22 and intensity control 24. The use of a remote light source enables the optical system to be shorter in overall length. An internal light source within housing 20 is coupled to a fiber optic cable 26 which provides for illuminating the workpiece 12, as better described in detail below. It is contemplated that a light source internal within 14 could also be used, for example in the form of a high intensity LED. Signals related to the image being detected are coupled to an appropriate video monitor or other image processing device (not shown) via cable 28. A shell or frame 30 can be provided to stabilize the device in use.

Now with reference to FIG. 2, the internal elements comprising moire contouring camera 10 will be described in detail. Camera housing 14 is a generally elongated tubular structure open at the end defining viewing end 16. Fiber bracket 36 mounts cable 26 to the side of housing 14 to inject light into the device. Mounting platform 38 is rigidly affixed within housing 14 for mounting various optical elements. Right angle prism 40 is mounted onto light shield 42 which is in turn rigidly affixed to mounting platform 38. In addition, a pair of lenses including collimating lens 44 and condenser lens 46 are placed in the illumination light path such that, as light is injected into housing 34 and reflected at prism 40, the beam passes through lens 44 and condenser lens 46. Collimating lens 44 is provided to enhance the transfer of light into the device, and condenser lens 46 recreates an image of the light source at the effective aperture of primary lens 52. As is evident from the figure, the illumination light path designated by ray 48 is inclined with respect to the optical axis 49 of the system. Grating 50 is also fastened to mounting platform 38 at a position such that the illumination light path 48 passes through grating 50. As the illumination light beam advances, it passes through primary lens 52 and then strikes mirror 54 and is reflected back towards the optical axis 49. The optical elements within the illumination light path 48 cause an image of the grating 50 to be focused upon an image plane 56 at which the workpiece 12 to be evaluated is placed during evaluation.

The light beam reflected from a workpiece 12 at the image plane 56 travels along the viewing optical path 58 which is coincident or nearly coincident with the systems optical axis 49. This light path passes again through primary lens 52 and thereafter through grating 50 and field lens 60 which images the aperture of the primary lens onto video camera lens 62. Extension ring 68 is provided for mounting video camera lens 62. Finally, the viewing light path passes through secondary lens 62 and becomes focused upon the image plane of video camera 18. As shown in the figures, primary lens 52 is conveniently mounted to lens mount 64 which is supported relative to mounting platform 38 via dowels 66.

Figure 2:
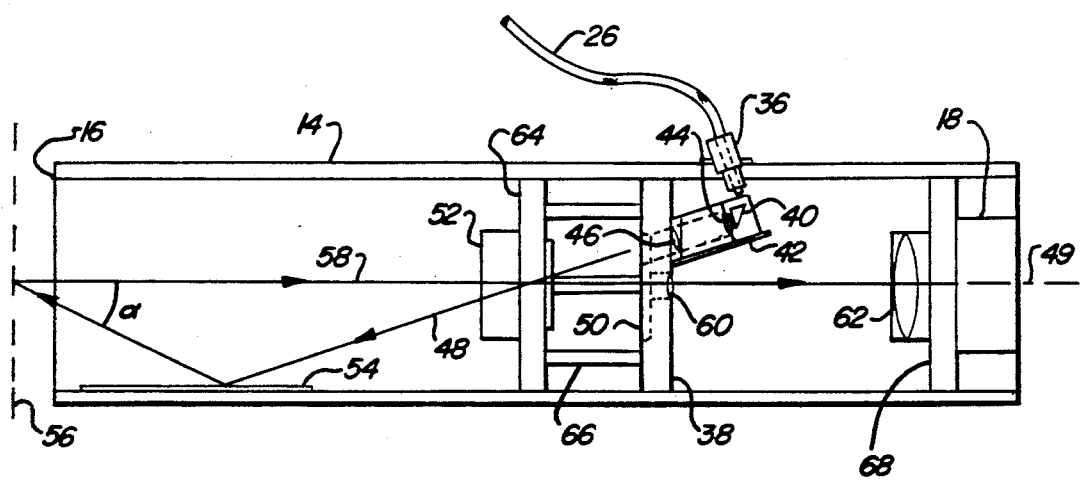
FIG. 2 is a longitudinal cross-sectional view of the device of FIG. 1 showing the internal components of the moire contouring system according to this invention.

In moire evaluation, the sensitivity of the generated moire fringe patterns is a function of a number of factors, including the angle of inclination between the illumination and viewing optical paths 48 and 58 designated in FIG. 2 as angle alpha which is also referred to as the occlusion angle. In addition, this sensitivity is a function of grating spacing on the workpiece. In accordance with well known moire principles, one method of decreasing fringe spacing and, therefore, contour sensitivity is to increase the occlusion angle. The design of moire contouring camera 10 in accordance with this invention employs an occlusion angle of about 20 degrees, which was deemed as sufficiently great to provide a desired level of fringe spacing while allowing the use of a conventional off-the-shelf lens for primary lens 52 having a field angle of approximately 60 degrees. To provide greater occlusion angles, it is likely that specialized lens would have to be provided for primary lens 52 having extreme wide angle capabilities.

It is noteworthy that the optical axes of both the illumination and viewing light paths are both coincident or nearly coincident with this design along longitudinal axis 49 and, therefore, a precise coincidence in focus can be provided through using a common primary lens 52. In order to avoid image edge distinctions, the inventors have found that the operation of the system is highly sensitive to the orientation of mirror 54 which must be set very close to being parallel to the optical axes of the system.

The moire contouring camera 10 in accordance with this invention includes an enhancement intended to reduce the effects of unwanted reflected stray light within housing 14 from impairing the image quality as detected by video camera 18. With reference to FIG. 2, it is apparent that light along illumination light path 48 upon striking primary lens 52 could cause first surface reflections of the light source back onto field lens 60 and thereafter to video camera 18. Although presently available anti-reflection coatings for lenses are highly efficient, they still permit a level of reflection of on the order of one-half to one percent of the incidence light. Although this intensity would appear minute and negligible, in operation of camera 10, a much smaller percent of the illumination light presented onto the workpiece 12 is actually reflected back through the system and, therefore, this level of unwanted reflection from the rear surface of primary lens 52 can constitute a large loss of definition and contrast. As a means of reducing the effects of such unwanted stray reflected light, the condenser lens 46 and the illumination light path 48 are angled from the plane represented by the sheet of FIG. 2, such that the illumination optical path 48 and viewing optical path 58 do not lie in a common plane. With this slight off-axis orientation, the image of the light source reflecting off the rear surface of primary lens 52 is cast upon field lens 60 at a position outside of its central axis. The image field of field lens 60 is inside the circular zone of the light source reflection off primary lens 52, and, therefore, the reflected light is not seen at video camera 18.

As a means of supplying the following table is provided which lists specific information concerning the significant optical elements of a preferred embodiment of this invention.

| ELEMENT NUMBER | ELEMENT NAME | DESCRIPTION |
| --- | --- | --- |
| 14 | Housing | 4" ID PVC |
| 40 | Prism | 10 × 10 × 14 mm 90 degrees #B32,544/Edmund Scientific |
| 44 | Collimating Lens | 12 mm dia. 36 mm focal length #B32,887/Edmund Scientific |
| 46 | Condenser Lens | 12 mm dia. 36 mm focal length #B32.887/Edmund Scientific |
| 50 | Grating | 300 lines per inch #B32,544/Edmund Scientific |
| 52 | Primary Lens | 40 mm - f/4 #77.040.01/Rodenstock |
| 54 | Mirror | 38 × 150 mm #B32,442/Edmund Scientific |
| 60 | Field Lens | #B32,887/Edmund Scientific |
| 62 | Secondary Lens | 50 mm F/1.4 Norman Camera |
| 68 | Lens Mount | #2712 Norman Camera |

As an alternate embodiment of this invention, video camera 18 could be substituted with an eyepiece to enable client viewing through the device.

While the above description constitutes the preferred embodiments of the present invention, it will be appreciated that the invention is susceptible of modification, variation and change without departing from the proper scope and fair meaning of the accompanying claims.

I claim:

1. A moire contouring imaging device comprising:
   an optical grating,
   a primary lens,
   light source means for projecting a beam of light along an illumination beam path, through said grating and said primary lens such that an image of said grating is projected onto an object focal plane, and
   viewing optical means for defining a viewing beam path in which light reflected from said object focal plane passes through said grating and said primary lens, wherein said illumination beam path and said viewing beam path are inclined with respect to one another at an occlusion angle at said object plane so that contours of an object at said object focal plane create moire fringe patterns.

2. A moire contouring imaging device according to claim 1 further comprising mirror means for reflecting rays along one of said beam paths causing said illumination beam path and said viewing beam path to converge at said object focal plane.

3. A moire contouring imaging device according to claim 1 further comprising a collimating lens and a condenser lens in said illumination beam path wherein said collimating lens collects light from said light source means and transfers light to said condenser lens which recreates an image of said light source on an aperture of said primary lens.

4. A moire contouring imaging device according to claim 1 further comprising a field lens along said viewing beam path for imagining an aperture of said primary lens.

5. A moire contouring imaging device according to claim 1 wherein said illumination beam path and said viewing beam path are inclined to define a relative angle as said beam paths pass through said primary lens.

6. A moire contouring imaging device according to claim 5 further comprising mirror means for reflecting said illumination beam from said light source means to converge with said viewing beam at said object focal plane.

7. A moire contouring imaging device according to claim 1 wherein said illumination beam path and said viewing beam path do not lie in a common plane such that light along said illumination beam path reflected off a first surface of said primary lens is not reflected in a path coincident with said viewing beam path.

8. A moire contouring imaging device according to claim 1 further comprising a video camera for imaging said object and placed in said viewing beam path beyond said grating and said primary lens.

9. A moire contouring imaging device comprising:
a an elongated housing defining a central axis,
a optical grating positioned in said housing,
a primary lens positioned in said housing,
a light source for projecting a beam of light along an illumination beam path which is inclined with respect to said housing central axis, said illumination beam path passing through said grating and said primary lens,
a mirror affixed to said housing for reflecting said illumination beam toward said housing central axis and imaging said grating onto and object positioned at an object focal plane displaced from said housing, and
an image sensor for receiving light reflected from said object along a viewing beam path which generally coincides with said housing central axis, said viewing beam path passing through said grating and said primary lens, wherein said illumination beam path and said viewing beam path are inclined with respect to one another at an occlusion angle at said object plane to create moire fringe patterns which are viewed by said image sensor.

10. A moire contouring imaging device according to claim 9 further comprising a collimating lens and a condenser lens in said illumination beam path wherein said collimating lens collects light from said light source and transfers light to said condenser lens which recreates an image of said light source on an aperture of said primary lens.

11. A moire contouring imaging device according to claim 9 further comprising field lens along said viewing beam path for imaging an aperture of said primary lens onto said image sensor.

12. A moire contouring imaging device according to claim 9 wherein said illumination beam path and said viewing beam path do not lie in a common place such that light along said illumination beam path reflected off a first surface of said primary lens is not reflected in a path coincident with said viewing beam path.

13. A moire contouring imaging device according to claim 12 wherein said imaging device further comprises a field lens positioned along said viewing beam path between said primary lens and said image sensor and said light reflected of the first surface of said primary lens strikes said field lens outside of the area of an aperture of said field lens through which said viewing beam passes.

* * * * *

UNITED STATES PATENT AND TRADEMARK OFFICE
CERTIFICATE OF CORRECTION

PATENT NO. : 5,069,549
DATED : December 3, 1991
INVENTOR(S) : Kevin G. Harding It is certified that error appears in the above-identified patent and that said Letters Patent is hereby corrected as shown below:

Column 6, Line 1, Claim 9, after "onto", the word "and" should read --an--.

Signed and Sealed this

Third Day of August, 1993

Attest:

MICHAEL K. KIRK

*Attesting Officer*    Acting Commissioner of Patents and Trademarks